United States Patent
Tegen

(10) Patent No.: US 10,246,051 B2
(45) Date of Patent: Apr. 2, 2019

(54) VEHICLE SEATBELT ASSEMBLY

(71) Applicant: Nissan North America, Inc., Franklin, TN (US)

(72) Inventor: Jesse Tegen, Canton, MI (US)

(73) Assignee: Nissan North America, Inc., Franklin, TN (US)

( * ) Notice: Subject to any disclaimer, the term of this patent is extended or adjusted under 35 U.S.C. 154(b) by 44 days.

(21) Appl. No.: 15/616,443

(22) Filed: Jun. 7, 2017

(65) Prior Publication Data
US 2018/0354456 A1    Dec. 13, 2018

(51) Int. Cl.
| | | |
|---|---|---|
| B60R 22/46 | (2006.01) | |
| B60R 22/48 | (2006.01) | |
| B60R 22/24 | (2006.01) | |
| B60R 22/22 | (2006.01) | |
| B60R 22/18 | (2006.01) | |

(52) U.S. Cl.
CPC ......... B60R 22/4604 (2013.01); B60R 22/22 (2013.01); B60R 22/24 (2013.01); B60R 22/4628 (2013.01); B60R 22/4671 (2013.01); B60R 22/48 (2013.01); *B60R 2022/1806* (2013.01); *B60R 2022/4666* (2013.01); *B60R 2022/4841* (2013.01)

(58) Field of Classification Search
CPC ......... B60R 2022/1843; B60R 22/195; B60R 22/1951; B60R 22/1953
See application file for complete search history.

(56) References Cited

U.S. PATENT DOCUMENTS

| | | | | |
|---|---|---|---|---|
| 3,163,467 A | * | 12/1964 | Deneau | B60R 22/12 267/156 |
| 3,860,261 A | * | 1/1975 | Takada | B60R 22/023 280/807 |
| 4,159,120 A | * | 6/1979 | Fohl | B60R 22/195 280/806 |
| 4,718,696 A | * | 1/1988 | Koide | B60R 22/26 280/801.1 |
| 4,738,485 A | * | 4/1988 | Rumpf | B60N 2/4221 280/806 |
| 5,015,010 A | * | 5/1991 | Homeier | B60N 2/00 280/808 |
| 5,308,116 A | | 5/1994 | Zawisa et al. | |
| 5,401,072 A | * | 3/1995 | Farrand | B60N 2/4228 280/808 |

(Continued)

*Primary Examiner* — Nicole T Verley
(74) *Attorney, Agent, or Firm* — Global IP Counselors, LLP

(57) ABSTRACT

A seatback portion has a tether passageway defined therein from proximate an upper section to proximate a lower section thereof. A seatbelt tether includes a tensioning mechanism, a tether ring and a connecting portion that extends from the tether ring to the tensioning mechanism. The connecting portion extends through the tether passageway with the tether ring located at the upper section outside the seatback portion. The tether ring is shaped and dimension to slide-ably receive a seatbelt. The tensioning mechanism selectively applies tension to the tether ring. In a non-tensioned state the tether ring is movable to an upper outboard side of the seatback portion. In a tensioned state the tether ring is pulled toward a headrest supporting section of the seatback portion inboard and away from the upper outboard side of the seatback portion.

19 Claims, 7 Drawing Sheets

(56) References Cited

U.S. PATENT DOCUMENTS

| | | | | |
|---|---|---|---|---|
| 5,658,051 | A * | 8/1997 | Vega | B60R 22/26 280/808 |
| 5,704,638 | A * | 1/1998 | Lane, Jr. | B60R 21/207 280/730.2 |
| 5,971,491 | A * | 10/1999 | Fourrey | B60R 22/1951 280/806 |
| 6,296,291 | B1 * | 10/2001 | Lansinger | B60N 2/4249 296/65.16 |
| 6,406,059 | B1 * | 6/2002 | Taubenberger | B60R 21/18 280/733 |
| 6,585,325 | B1 * | 7/2003 | Pal | B60R 22/26 297/452.2 |
| 6,655,745 | B2 * | 12/2003 | Fohrenkamm | B60N 2/24 297/188.04 |
| 6,767,055 | B1 * | 7/2004 | Sparks | B60N 2/162 297/216.13 |
| 7,644,952 | B2 * | 1/2010 | Holtz | B60R 22/1951 280/801.1 |
| 7,806,440 | B2 * | 10/2010 | Clute | B60R 21/26 280/730.2 |
| 7,850,205 | B2 * | 12/2010 | Pisaniello | B60R 22/023 280/801.1 |
| 8,240,736 | B2 * | 8/2012 | Coenen | B60N 2/4214 280/801.1 |
| 8,376,407 | B2 * | 2/2013 | Adolfsson | B60R 22/18 180/268 |
| 8,469,401 | B2 * | 6/2013 | Humbert | B60N 2/24 280/801.1 |
| 8,820,790 | B2 * | 9/2014 | Wenz | B60N 2/58 280/801.1 |
| 9,475,453 | B2 * | 10/2016 | Ballarin | B60N 2/50 |
| 9,783,155 | B2 * | 10/2017 | Kondo | B60N 2/79 |
| 2007/0235999 | A1 * | 10/2007 | Morra | B60R 22/1951 280/806 |
| 2008/0303325 | A1 * | 12/2008 | Scholz | B60N 2/2806 297/250.1 |
| 2012/0217787 | A1 * | 8/2012 | Adolfsson | B60R 22/18 297/480 |
| 2017/0174176 | A1 * | 6/2017 | Hillmann | B60R 22/1951 |

* cited by examiner

VEHICLE SEATBELT ASSEMBLY

BACKGROUND

Field of the Invention

The present invention generally relates to a vehicle seatbelt assembly that includes a seatbelt tether coupled to a seatbelt. More specifically, the present invention relates to a vehicle seatbelt assembly with a seatbelt tether where the seatbelt tether draws a shoulder area portion of a seatbelt toward a headrest portion of a corresponding seatback portion in response to detection of a tensioning event.

Background Information

A seatbelt of a seatbelt assembly is configured to releasably attach to a buckle or latch mechanism attached to a seat cushion portion of a seat assembly. When the seatbelt is buckled in place to the buckle or latch mechanism, the seatbelt extends over portions of a seated passenger limiting or restricting movement of the passenger. Specifically, a lower portion of the buckled seatbelt extends along a waist or hip area of the passenger, and an upper portion of the seatbelt extends diagonally across the torso from the buckle assembly to a shoulder area of the passenger. Depending upon the height and width of the passenger, the upper portion of the seatbelt can extend to an outer area of the passenger's shoulder or an area above the shoulder adjacent to the outer area of the shoulder of the passenger.

SUMMARY

One object of the present disclosure, is to provide a seatbelt assembly with a seatbelt tether supported by a corresponding seat assembly, where the seatbelt tether is configured to draw an upper portion of the seatbelt toward a headrest portion of the seat assembly in response to detection of a tensioning event.

In view of the state of the known technology, one aspect of the present disclosure is to provide a vehicle seatbelt assembly with a seat assembly and a seatbelt tether. The seat assembly has a seat cushion portion and a seatback portion. The seat cushion portion is configured to attach to a floor structure within a passenger compartment of a vehicle. The seatback portion is supported to the seat cushion portion and has a tether passageway defined therein that extends from proximate an upper section to proximate a lower section thereof. The seatbelt tether has a tensioning mechanism, a tether ring and an elongated connecting portion. The tensioning mechanism is fixed to one of the floor structure and the seat cushion portion of the seat assembly. The elongated connecting portion is attached to the tensioning mechanism to the tether ring and extends from the tensioning mechanism through the tether passageway to the tether ring. The tether ring is located outside the tether passageway at the upper section of the seatback portion. The tether ring is shaped and dimension to receive a seatbelt such that the seatbelt can slidably move therethrough. The tensioning mechanism is configured to selectively apply tension to the elongated connecting portion and the tether ring in response to detection of a tensioning event. Specifically, with the tensioning mechanism in a non-tensioned state the tether ring is moveable to an upper outboard side of the seatback portion. In a tensioned state the tether ring is pulled toward a headrest supporting section of the seatback portion inboard and away from the upper outboard side of the seatback portion.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
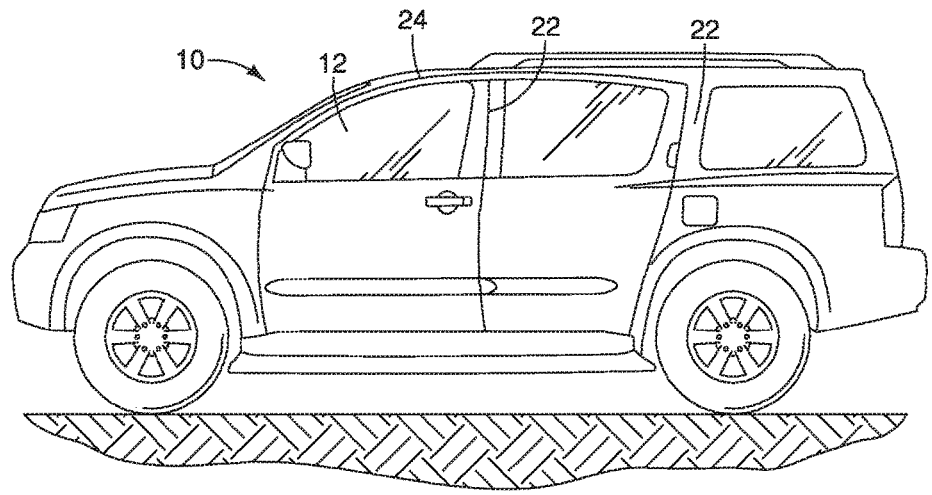
FIG. 1 is a side view of a vehicle that includes passenger compartment with a seatbelt assembly in accordance with a first embodiment.
Figure 2:
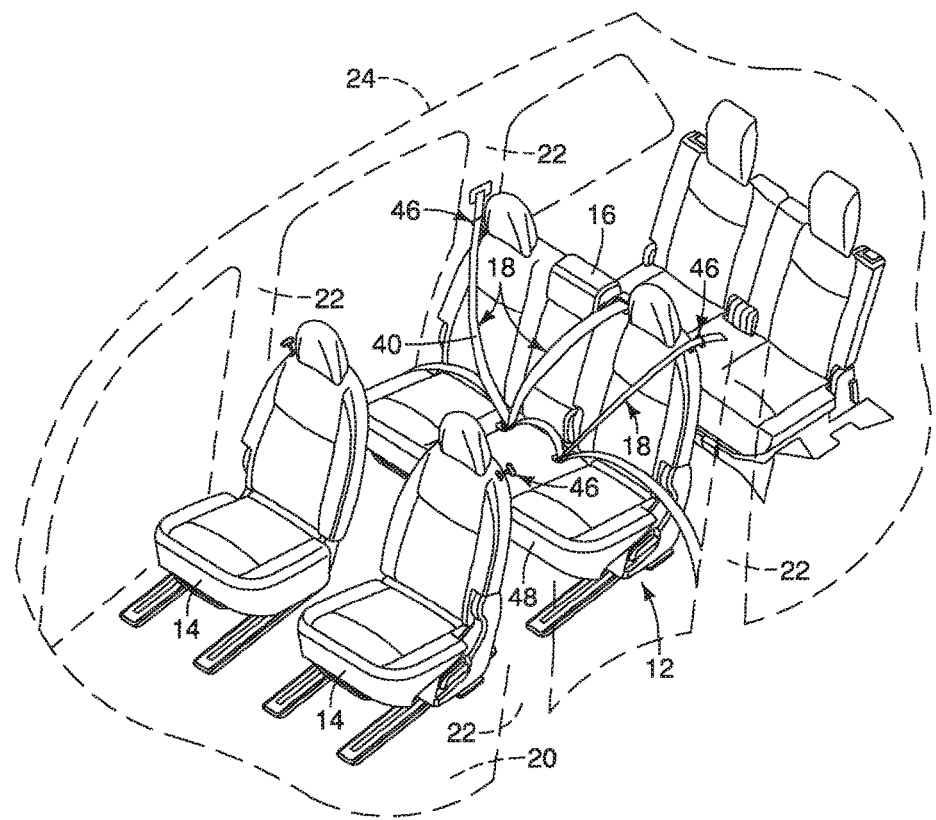
FIG. 2 is a perspective view of the vehicle showing the passenger compartment, a floor structure, pillar structures, seat assemblies and seatbelt assemblies in accordance with the first embodiment.

Referring initially to FIG. 1, a vehicle 10 is illustrated in accordance with a first embodiment. As shown in FIG. 2, the vehicle 10 defines a passenger compartment 12 with front seat assemblies 14 and rear seat assemblies 16, each seat having corresponding seatbelt assemblies 18, as described in greater detail below.

The vehicle 10 further includes a floor structure 20, pillar structures 22 and a roof structure 24 that at least partially define the passenger compartment 12, as shown in FIG. 2.

Figure 3:
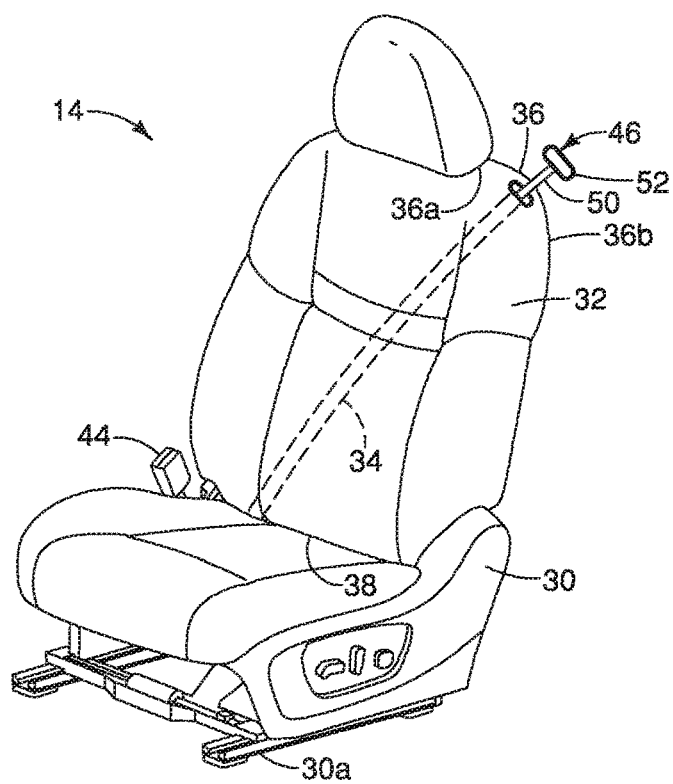
FIG. 3 is a perspective view of one of the seat assemblies shown removed from the vehicle and showing portions of one of the seatbelt assemblies in accordance with the first embodiment.

As depicted in FIG. 3, one of the front seat assemblies 14 is shown removed from the vehicle 10. Since the front seat assemblies 14 and the rear seat assemblies 16 have generally the same features with respect to the seatbelt assemblies 18, only one seat assembly, the front seat assembly 14, is described herein below for the sake of brevity. However, the description of the front seat assembly 14 applies equally to the rear seat assemblies 16.

Figure 4:
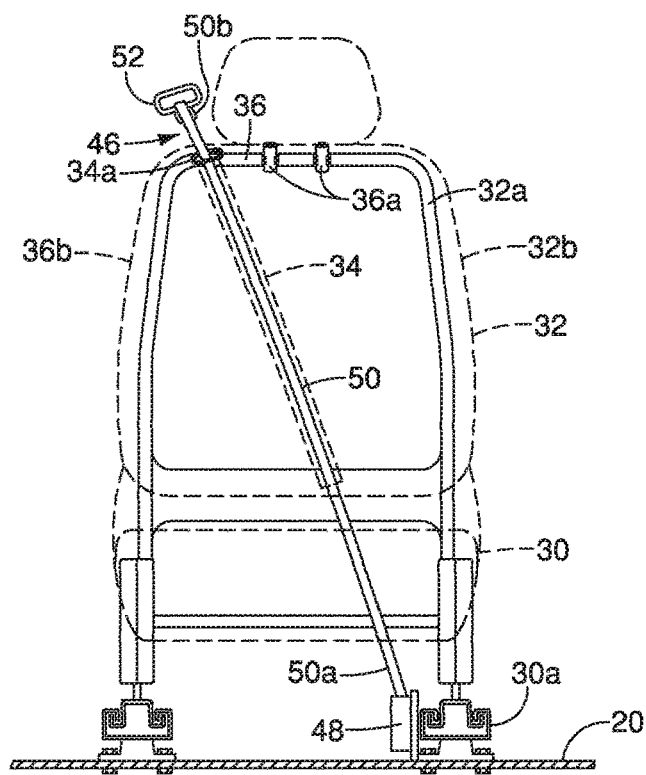
FIG. 4 is a rear view of a portion of the seat assembly depicted in FIG. 3, showing a metallic frame of the seat assembly, cushion portions of the seat assembly shown in phantom, a tether passageway within the cushion portions and elements of the seat tether including a tensioning mechanism, an elongated connecting portion and a tether ring in accordance with the first embodiment.
Figure 5:
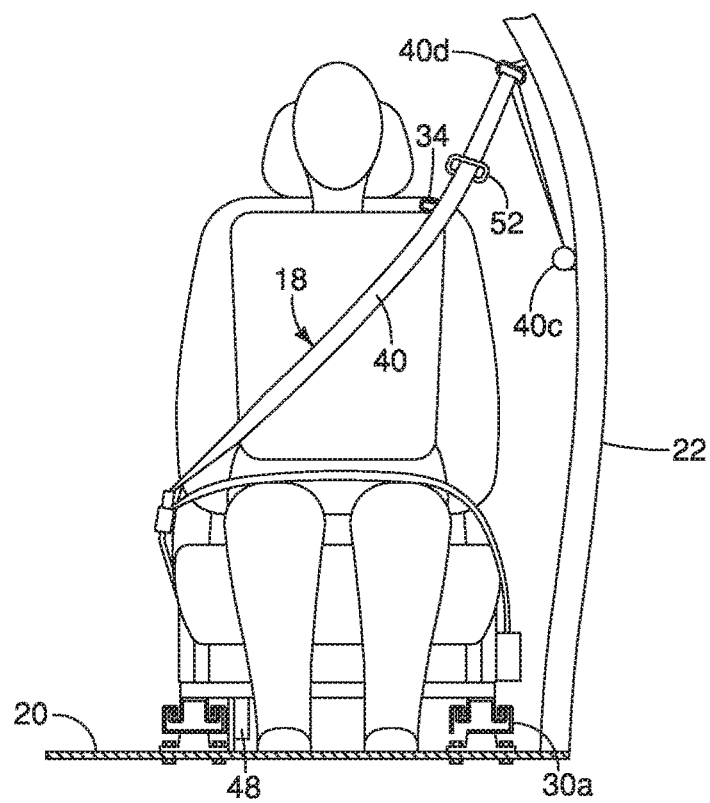
FIG. 5 is a front view of the seat assembly installed within the passenger compartment on the floor structure and adjacent to one of the pillar structures, showing a belt of the seatbelt assembly latched to a latch mechanism such that a lower portion of the belt extends across a hip area of a passenger and an upper portion of the belt extends diagonally across a torso of the passenger, with the tether ring shown with the seatbelt tether in a non-tensioned state in accordance with the first embodiment.
Figure 6:
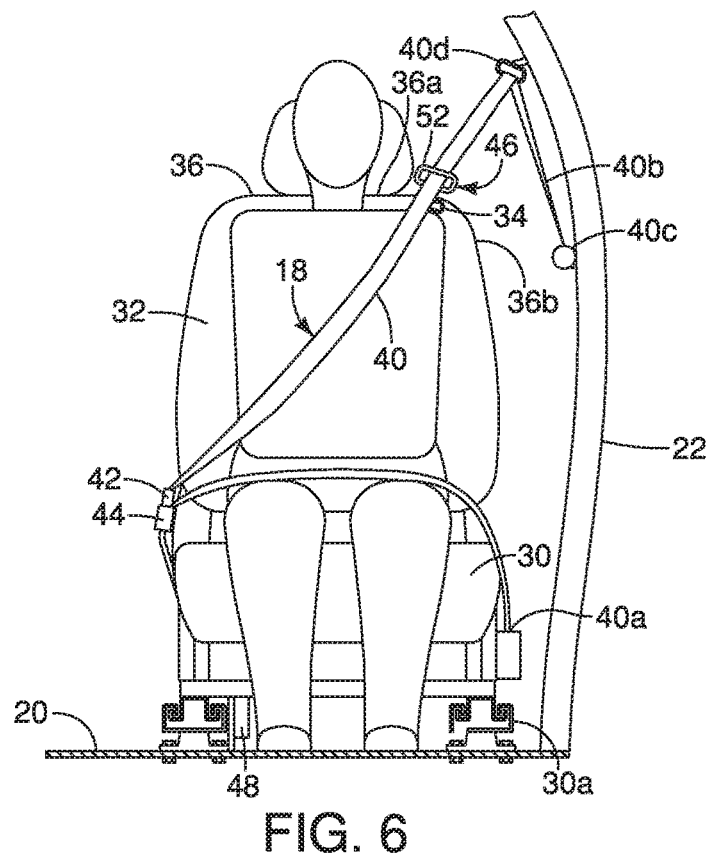
FIG. 6 is another front view of the seat assembly similar to FIG. 5 with the tether ring shown with the seatbelt tether in a tensioned state in response to detection of a tensioning event in accordance with the first embodiment.

The front seat assembly 14 (hereinafter referred to as the seat assembly 14) has a seat cushion portion 30 and a seatback portion 32. The seat cushion portion 30 is configured to attach to the floor structure 20 within the passenger compartment 12 of the vehicle 10, as shown in FIGS. 4-6. As shown in FIG. 4, the seatback portion 32 includes a metallic frame 32a and a cushion portion 32b (also referred to as upholstery) that surrounds and conceals the metallic frame 32a. The metallic frame 32a is supported to the seat cushion portion 30 in a conventional manner. The seatback portion 32 can optionally include an angle adjusting mechanism (not shown) that allows the seatback portion 32 to be reclined relative to the seat cushion portion 30. The seatback portion 32 has a tether passageway 34 defined within the cushioning portion 32b. The tether passageway 34 is basically a void, space or channel formed or defined within the upholstery of the seatback portion 32 that extends from proximate an upper section 36 of the seatback portion 32 to proximate a lower section 38 thereof.

Figure 9:
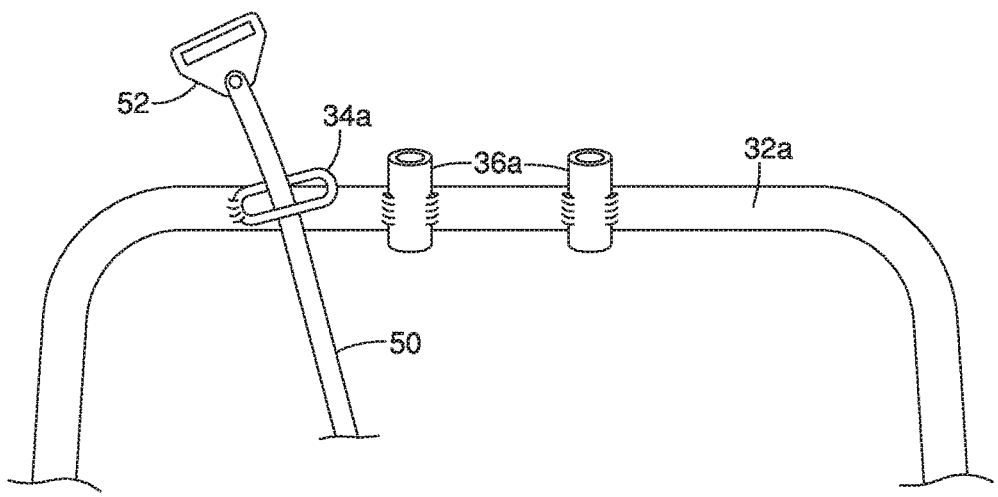
FIG. 9 is a schematic view of a metallic frame of the seatback portion of the seat assembly showing a guide ring welded to an upper end of the metallic frame in accordance with the first embodiment.

As is also shown in FIGS. 4 and 9, the metallic frame 32a includes a guide ring 34a (an upper ring) fixedly attached thereto by, for example, welding. The guide ring 34a defines an upper end of the tether passageway 34. The elongated connecting portion 50 of the seatbelt tether 46 extends through the guide ring 34a as it exits the tether passageway 34.

As shown in FIGS. 4-6, the seat assembly 14 includes one of the seatbelt assemblies 18. Since the seatbelt assemblies 18 are structurally and functionally identical to one another, only one seatbelt assembly 18 is described herein below for the sake of brevity.

The seatbelt assembly 18 includes a belt 40, a latch tongue 42, a latch mechanism 44 (also referred to as a seatbelt buckle assembly) and a seatbelt tether 46. As shown in FIGS. 5 and 6, the belt 40 has a first end 40a and a second end 40b. The first end 40a of the belt 40 is fixedly attached to a support structure 30a of the seat cushion portion 30 of the seat assembly 14 in a conventional manner. Alternatively, the first end 40a can be fixedly attached to the floor structure 20 in a conventional manner. The second end 40b of the belt 40 includes a belt retractor 40c.

The belt retractor 40c is depicted in FIGS. 5 and 6 as being fixedly attached to the adjacent pillar structure 22. The belt retractor 40c can be concealed beneath pillar trim panel(s) (not shown) or can be visible. Alternatively, the belt retractor can be mounted to the floor structure 20 in a conventional manner. The belt retractor 40c is spring biased such that when the belt 40 is not in use, a large portion of the belt 40 is retracted into the belt retractor 40c and around a spool (not shown), and at least partially concealed. The belt retractor 40c also includes a locking mechanism (not shown) that prevents movement of the belt 18 relative to the belt retractor 40c in response to rapid movement of the belt 18 out of the belt retractor 40c. Associated with the belt retractor 40c is a support ring 40d (also referred to as a D-ring) that is fixedly attached to an upper area of the pillar structure 24 in a conventional manner. A portion of the belt 18 slidably passes through a slot defined in the D-ring 40d in a conventional manner. Since support rings, belt retractors and locking mechanisms within belt retractors are well known conventional seatbelt related mechanisms and structures, further description is omitted for the sake of brevity.

The latch tongue 42 is a conventional device that is configured to slidably receive the belt 18, with the belt 18 extending through slots formed in portion of the latch tongue 42. The latch tongue 42 can include a locking mechanism (not shown) that temporarily prevents movement of the belt 18 relative to the latch tongue 42 in response to a predetermined level of force being applied to the belt 18 at only one side of the latch tongue 42. For example, in response to rapid deceleration of the vehicle 10, a passenger seated in the seat assembly 14 can move forward in accordance with Newtonian mechanics (also known as Newton's Laws of Motion) thereby applying force to the portions of the belt 18 located above the latch tongue 42 and the latch mechanism 44. These forces cause the locking mechanism within the latch tongue 42 to temporarily restrict movement of the belt 18 through the latch tongue 42.

The latch mechanism 44 (seatbelt buckle assembly) is fixed to the seat cushion portion 30 of the seat assembly 14 in a conventional manner and is configured to releasably secure the latch tongue 42 (and the belt 18) in a fixed position relative to the latch mechanism. Alternatively, the latch mechanism 44 can be directly secured to the floor structure 20 in a conventional manner. Since latch tongues, lock mechanisms of latch tongues and latch mechanisms are well known conventional structures, further description is omitted for the sake of brevity.

Figure 7:
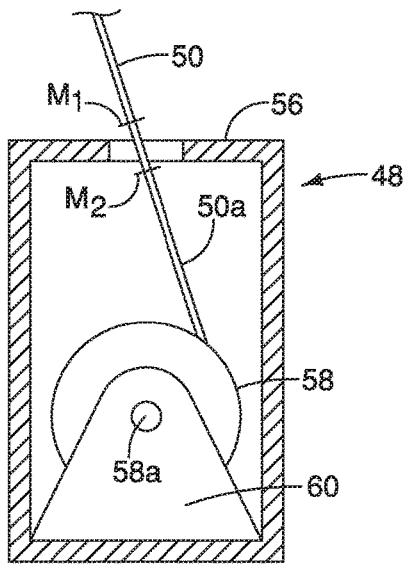
FIG. 7 is a cross-sectional view of the tensioning mechanism showing the elongated connecting portion connected to a spool and a motor connected to the spool with the tensioning mechanism in the non-tensioned state in accordance with the first embodiment.
Figure 8:
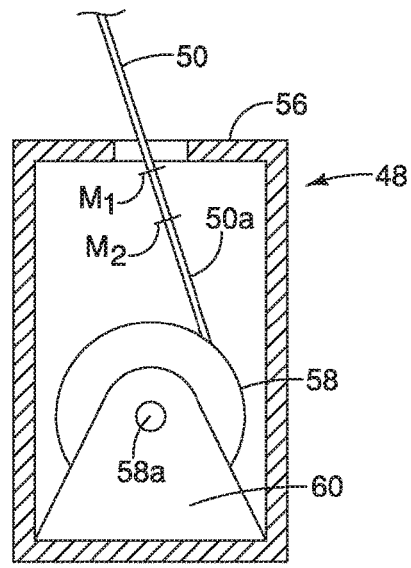
FIG. 8 is another cross-sectional view of the tensioning mechanism showing the tensioning mechanism in the tensioned state in accordance with the first embodiment.

As shown in FIG. 4, the seatbelt tether 46 includes a tensioning mechanism 48, an elongated connecting portion 50 and a tether ring 52. The tensioning mechanism 48 is configured to apply a predetermined level of force on the elongated connecting portion 50 in response to a rapid change in velocity of the vehicle 10, thereby pulling on the tether ring 52, as is described in greater detail below. The tensioning mechanism 48 can include any of a variety of force producing mechanisms. As shown in FIGS. 7 and 8, in the first embodiment, the tensioning mechanism 48 includes a housing 56, a spool 58 and an electric motor 60. The housing 56 is fixedly attached to the support structure 30a of the seat assembly 18. The electric motor 60 is fixedly mounted within the housing 56 and is connected to the spool 58. The spool 58 is rotatable about a shaft 58a. The electric motor 60 is configured to rotate the shaft 58a and the spool 58, but only rotates the spool 58 a predetermined number of degrees relative to the shaft 58a.

The elongated connecting portion 50 can be a plastic or polymer coated cable, a woven strap or woven belt similar to the belt 40, a metallic rod, a nylon strap, or any other suitable material able to withstand a predetermined level of force corresponding to the requirements of the seatbelt assembly 18. A first end 50a of the elongated connecting portion 50 is fixedly attached to the spool 58, and a second end 50b is fixedly attached to the tether ring 52.

The tether ring 52 can be made of polished metal, such as stainless steel, chrome covered steel, or any other suitable material able to withstand a predetermined level of force corresponding to the requirements of the seatbelt assembly 18. The tether ring 52 is dimensioned such that the belt 40 of the seatbelt assembly 18 can be inserted therethrough and is freely moved through the tether ring 52 with the belt 40 in an un-tensioned state.

In a deactivated state shown in FIG. 7, an end of the elongated connection portion 50 is attached to the spool 58, but is held in a fixed position via mechanical stop pins or gears (not shown) that prevent the elongated connection portion 50 from moving. In FIG. 7, an area of the elongated connection portion 50 outside the housing 56 of the tensioning mechanism 48 is shown with an imaginary mark $M_1$, and an area of the elongated connection portion 50 inside the housing 56 of the tensioning mechanism 48 is shown with another imaginary mark $M_2$. In response to the electric motor being activated, as shown in FIG. 8, the spool 58 is rotated by a predetermined number of degrees relative to the shaft 58a thereby pulling on the elongated connecting portion 50, drawing the elongated connecting portion 50 to wrap partway around the spool 58. As a result, the elongated connecting portion 50 is moved a predetermined distance, as demonstrated by the movement of the marks $M_1$ and $M_2$. The movement of the elongated connection portion 50 is determined by a desired amount of movement of the tether ring 52, as described in greater detail below. The movement of the elongated connecting portion 50 as a result of activation of the motor 60 further causes the tether ring 52 to be moved, as described further below.

As shown in FIG. 4, most of the overall length of the elongated connection portion 50 is located within the tether passageway 34 of the seatback portion 32. The first end 50a of the elongated connection portion 50 is fixed to the spool 58 of the tensioning mechanism 48, as shown in FIGS. 7 and 8. From the tensioning mechanism 48, the elongated connection portion 50 extends from the tensioning mechanism 48 into an opening at a lower end of the tether passageway 34 along the lower section 38 of the seatback portion 32 and upward through the tether passageway 34. The elongated connection portion 50 then exits the tether passageway 34 at the upper section 36 of the seatback portion 32 passing through the upper ring 34a adjacent to a headrest supporting portion 36a of the upper section 36 of the seatback portion 32. The second end 50b of the elongated connection portion 50 is attached to the tether ring 52 above the seatback portion 32, outside of the tether passageway 34.

With tensioning mechanism 48 in the deactivated state (a non-tensioned state), the elongated connection portion 50 is dimensioned such that the tether ring 52 can extend in an outboard direction away from the headrest supporting portion 36a toward an upper outboard side 36b of the upper section 36 of the seatback portion 32, as shown in FIG. 5.

In response to activation of the electric motor 60 of the tensioning mechanism 48 (to the tensioned state), the spool 58 is rotated the predetermined number of degrees, applying a predetermined level of force (tension) on the elongated connection portion 50. The activation of the electric motor 60 is further tuned to draw a predetermined portion of the elongated connection portion 50 downward such that the tether ring 52 is moved a predetermined distance toward the headrest supporting portion 36a of the seatback portion 32, as shown in FIG. 6. As is demonstrated in in FIGS. 5 and 6, movement of the tether ring 52 (note the movement of the marks $M_1$ and $M_2$) causes corresponding movement of that portion of the belt 40 extending through and adjacent to the tether ring 52. This movement causes the tether ring 52 to move toward the headrest supporting portion 36a by a predetermined distance. This predetermined distance can be anywhere from 1 cm to 10 cm, depending upon the overall design of the vehicle 10, the design of the elements of the seatbelt assembly 18 and/or the design and overall shape of the seat assembly 14.

In other words, in a non-tensioned state shown in FIG. 5, the elongated connecting portion 50 is extendable from the tensioning mechanism 48 with the tether ring 52 being similarly moveable to the upper outboard side 36b of the seatback portion 32. In a tensioned state shown in FIG. 6, the tensioning mechanism 48 selectively applies tension to the elongated connecting portion 50 and pulls the elongated connecting portion 50 downward by a predetermined distance such that the tether ring 52 is pulled away from the upper outboard side 36b of the upper section 36 of the seatback portion 32 toward the headrest supporting section 36a of the seatback portion 32 inboard and away from the upper outboard side 36b of the seatback portion 32.

The tensioning mechanism 48 is operable to apply tension to the elongated connecting portion 50 and the tether ring 52 in response to detection of a tensioning event, as is described in greater detail below with reference to FIG. 10.

Figure 10:
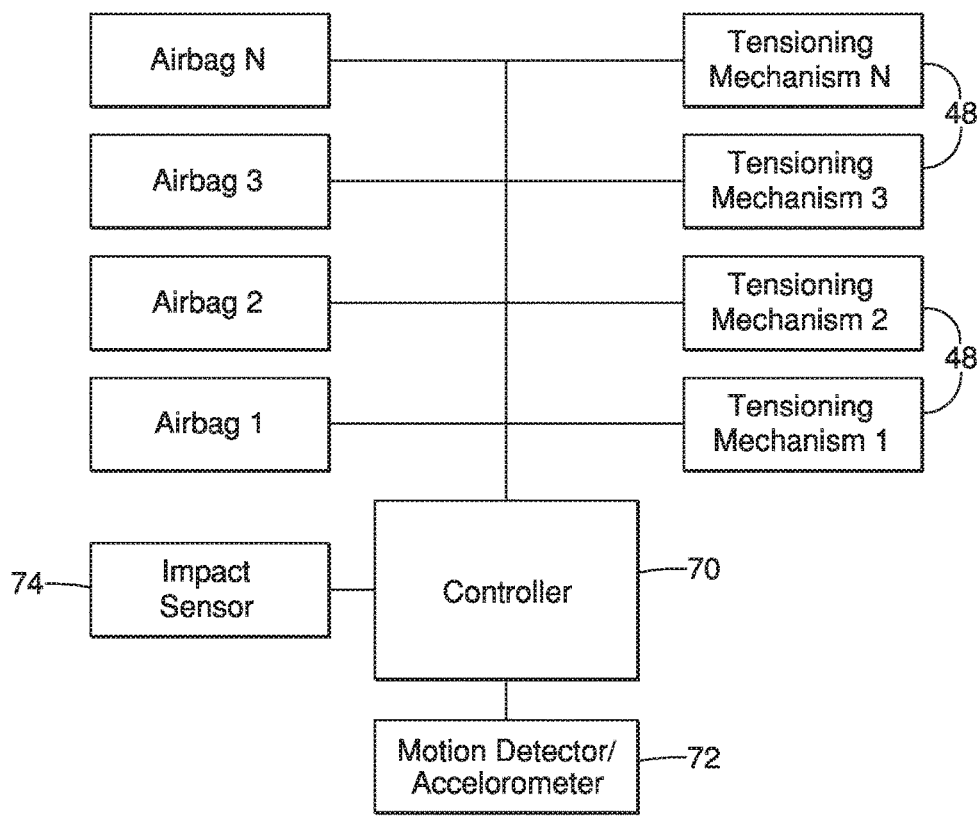
FIG. 10 is a block diagram of a portion of the seatbelt assembly, showing a controller and sensors that control operation of the tensioning mechanism of the seatbelt tether and seatbelt assembly in accordance with the first embodiment.

As shown in FIG. 10, the tensioning mechanism 48 of each of the seatbelt tethers 46 is connected to a controller 70. The controller 70 is further connected to a motion detector 72 and an impact sensor 74. The motion detector can be any of a variety of sensors, such as a motion sensor, an accelerometer, or similar sensing device that is configured to detect rapid changes in acceleration and velocity of the vehicle 10. The controller 70 can also be connected to conventional airbags 1 through N installed within the vehicle 10 in a conventional manner.

The motion detector 72 is configured to detect rapid changes in acceleration and velocity of the vehicle 10. The impact sensor 74 can be a plurality of sensors located at a front area and/or a rear area of the vehicle, preferably within a bumper assembly.

In the first embodiment, the rapid changes in acceleration and velocity of the vehicle 10 are referred to herein as tensioning events. The tensioning events can be divided into two categories: non-impact related tensioning events and impact related tensioning events. The non-impact related tensioning events include events such as a vehicle operator forcefully and rapidly applying braking force causing the vehicle 10 to come to a rapid complete stop, or to slow down rapidly (i.e., rapid deceleration or rapid reduction in velocity). Another example of rapid deceleration is the driving of the vehicle 10 into a significant depth of water (more than a few inches of water, such as more than 3 or 4 inches of water). Such an event causes rapid changes in acceleration and velocity, but is not necessarily associated with an impact event. Impact related tensioning event can be in the form of the vehicle contacting a fixed object or another vehicle and therefore coming to an almost immediate stop.

In the first embodiment of the seatbelt assembly 18, the motion detector 72 detects all changes in acceleration and velocity and is connected to the controller 70. The impact sensor 74, on the other hand, detects only the occurrence of impact events (an impact related tensioning event) where the vehicle 10 has come to an immediate stop and/or has made contact with another vehicle at a speed greater than a predetermined velocity causing the vehicle to immediately change speed or come to a complete stop.

The controller 70 is configured to detect all tensioning events and distinguish between a non-impact related tensioning event and an impact related tensioning event. Alternatively, the motion detector 72 and the controller 70 can be configured to detect and distinguish between a non-impact related tensioning event and an impact related tensioning event in the absence of the impact sensor 74.

The controller 70 receives signals from both the motion detector 72 and the impact sensor(s) 72. The controller 70 is configured to determine whether the tensioning event is merely a rapid change in velocity and acceleration, or whether the tensioning event is an impact event.

In response to the controller 70 determining that the tensioning event is a rapid change in velocity and acceleration and is a non-impact related tensioning event (i.e. the vehicle operator slamming his or her foot on the brake pedal for more than one second or a quick pulse application of brakes—a hard braking event), the controller 70 triggers the tensioning mechanisms 48 to operate by moving to the tensioning state causing the spool 58 to rotate a predetermined number of degrees, causing the elongated connecting portion 50 to be wrapped partially around the spool 58 and further causing the tether ring 52 to be moved away from an outboard side of the upper section of the seatback portion 32 toward the headrest supporting portion 36a of the seatback portion 32. In this circumstance, the controller 70 does not trigger the airbags 1 to N to inflate. After a predetermined period of time (for example, 10 seconds after the tensioning event) the controller 70 can cause the tensioning mechanisms 48 to return to the non-tensioned state.

In response to the controller 70 determining that the tensioning event is also an impact event where the vehicle 10 has made contact with a fixed object or another vehicle, the controller 70 triggers the tensioning mechanisms 48 to move to the tensioning state and causes the airbags 1 to N (or activated ones thereof) to deploy and inflate. After a predetermined period of time (for example, 10 seconds after the tensioning event) the controller 70 can cause the tensioning mechanisms 48 to return to the non-tensioned state.

When moved to from the non-tensioning state to the tensioning state, the tensioning mechanism 48 is configured to apply a predetermined level of force or tension to the elongated connecting portion 50 and the tether ring 52. Further, when triggered to move to the tensioning state, the tensioning mechanism 48 limits movement of the spool 58 to a predetermined amount of movements. Specifically, the tensioning mechanism 48 when triggered by the controller 70 to move to the tensioning state moves the elongated connecting portion 50 and the tether ring 52 a predetermined distance. This predetermined distance is dependent mainly upon design considerations of the vehicle 10, such as the size of the width of the seatback portion 32, the anticipated size of the vehicle passengers and vehicle operator, and the interior dimensions of the passenger compartment 12 of the vehicle 10.

The movement of the tether ring 52 from its position in the non-tensioned state to tensioned state causes the tether ring 52 to pull the belt 40 toward the headrest supporting portion 36a of the seat assembly 18. This movement causes that portion of the belt 40 to move to a position that is approximately centered between a passenger's shoulder and neck. During rapid deceleration and/or an impact event, the belt 40 restrains movement of the passenger while closely contacting a central portion of the upper torso of the passenger. Consequently, forward and lateral movement of the upper torso of the passenger is further restrained with the inclusion of the seatbelt tether 46 in the tensioned state.

Second Embodiment

Figure 11:
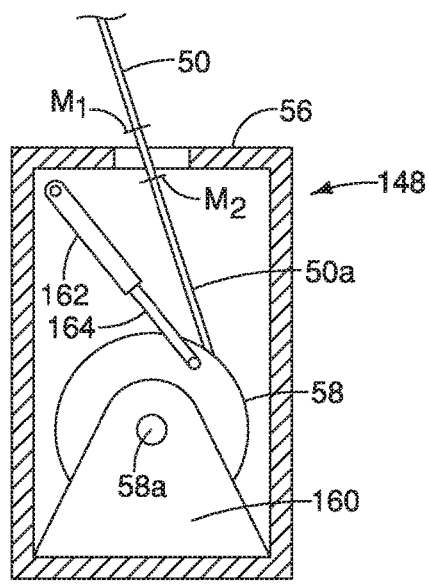
FIG. 11 is a cross-sectional view of a tensioning mechanism showing the elongated connecting portion connected to a spool and an actuation mechanism in the non-tensioned state in accordance with a second embodiment
Figure 12:
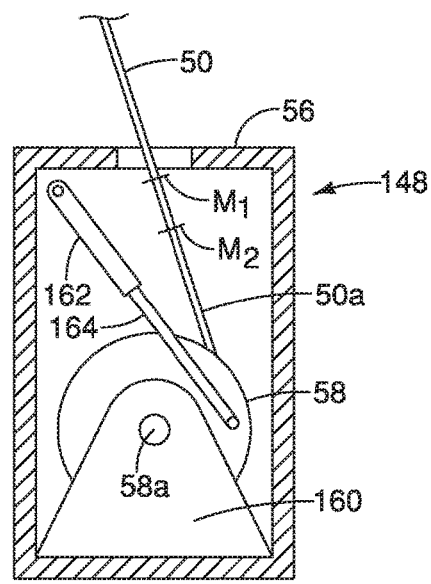
FIG. 12 is another cross-sectional view of the tensioning mechanism showing the tensioning mechanism in the tensioned state in accordance with the second embodiment.

Referring now to FIGS. 11 and 12, a tensioning mechanism 148 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the first embodiment, the tensioning mechanism 48 was operated via the movement and force applying capability of the electric motor 60. However, use of an electric motor is not the only means for controlling the retraction of the tether ring 52.

In the second embodiment, the tensioning mechanism 48 of the first embodiment is replaced with the tensioning mechanism 148.

The tensioning mechanism 148 includes the housing 56, the spool 58, a support portion 160 and an actuation mechanism 162. As depicted in FIGS. 11 (non-tensioned state) and 12 (tensioning state), the actuation mechanism 162 can be any of a variety of mechanisms. For example, the actuation mechanism 162 can be an electronic solenoid operated in a manner similar to the electric motor 60 of the first embodiment. Alternatively, the actuation mechanism 162 can be a one-time usage triggering device, such as a pyrotechnic device activated with activation of the airbags 1 to N, or can be a strong coil spring that is electronically released by the controller 70 to apply rotary force and movement to the spool 58.

Third Embodiment

Figure 13:
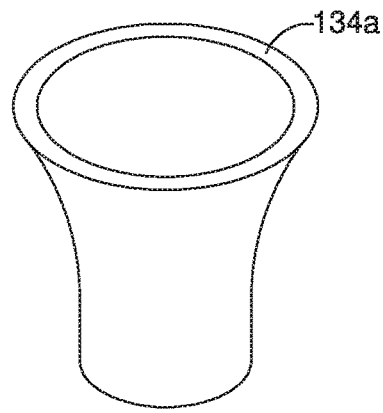
FIG. 13 is a guide ring shown removed from the seat assembly in accordance with a third embodiment.

Referring now to FIG. 13, a guide ring 134a (an upper ring) of the seat assembly 14 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the guide ring 34a of the first embodiment is replaced with the guide ring 134a. The guide ring 34a of the first embodiment is made of a metallic wire material bent to the depicted shape in FIGS. 4 and 9 and welded to the metallic frame 32a.

In the third embodiment, the guide ring 134a has an overall funnel or conical shape.

Fourth Embodiment

Figure 14:
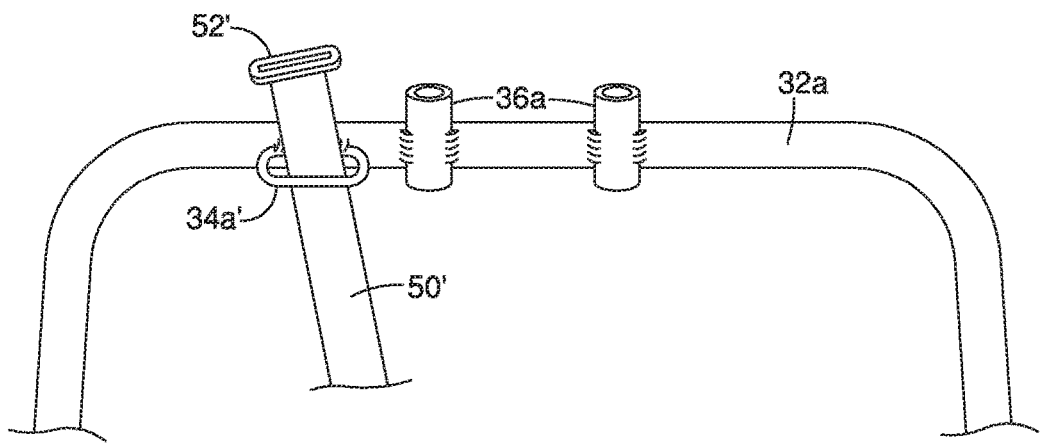
FIG. 14 is a guide ring and a metallic frame of the seat assembly in accordance with a fourth embodiment.

Referring now to FIG. 14, the metallic frame 32a with a guide ring 34a' in accordance with a fourth embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the fourth embodiment, the guide ring 34a of the first embodiment is replaced with the guide ring 34a'. The guide ring 34a of the first embodiment is welded to the metallic frame 32a at one longitudinal end of the guide ring 34a, as shown in FIGS. 4 and 9.

In the third embodiment, the guide ring 34a' is welded to the metallic frame 32a along a longitudinal edge of the guide ring 34a' with an elongated connecting portion 50' (a belt material) extending therethrough with a tether ring 52' being located above the metallic frame 32a and the guide ring 34a'.

Fifth Embodiment

Figure 15:
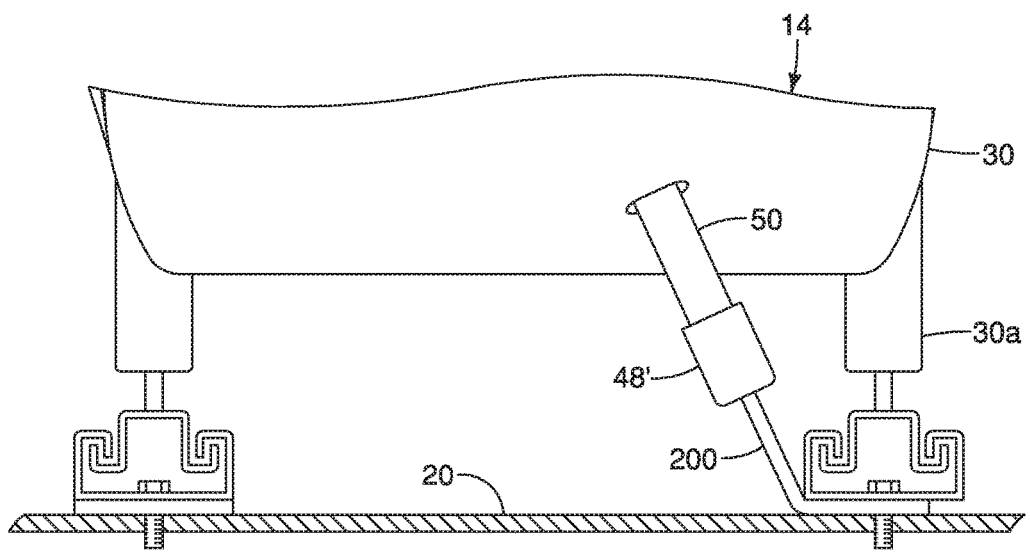
FIG. 15 is a rear view of the support structure of the seat assembly showing an alternative arrangement for attaching the tensioning mechanism of the seatbelt tether of the seatbelt assembly directly to the floor structure of the vehicle in accordance with a fifth embodiment.
Figure 16:
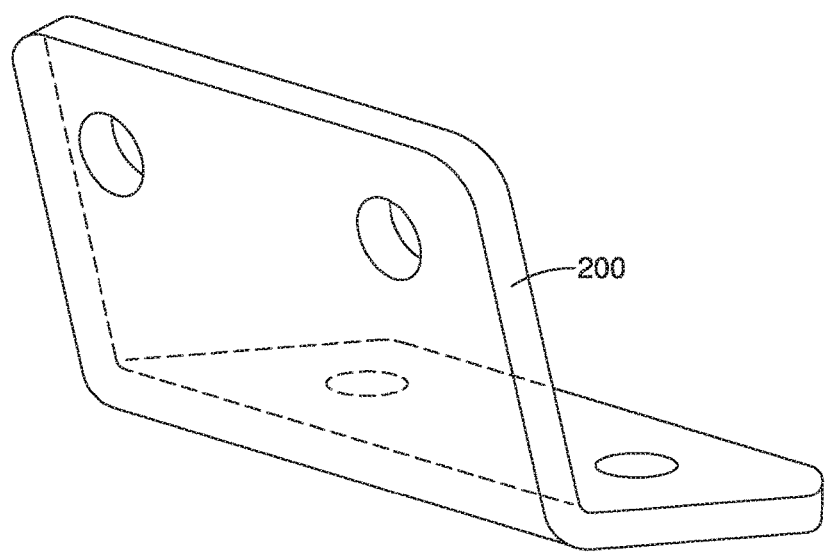
FIG. 16 is a perspective view of a bracket mounted between the tensioning mechanism and the floor structure of the vehicle in accordance with the fifth embodiment.

Referring now to FIGS. 15 and 16, the seat cushion portion 30, the support structure 30a and a tensioning mechanism 48' in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity. The parts of the fifth embodiment that differ from the parts of the first embodiment will be indicated with a single prime (').

In the fifth embodiment, the tensioning mechanism 48' attaches to a bracket 200 that is bolted to the floor structure 20, and sandwiched between the floor structure 20 and the support structure 30a of the seat cushion portion 30. The bracket 200 is shown removed from the vehicle 10 in FIG. 16.

The controller 70 preferably includes a microcomputer with a seatbelt tether control program and an airbag deployment control program that controls the operation of the tensioning mechanism 48 and deployment of the airbags 1 to N. The controller 70 can also include other conventional components such as an input interface circuit, an output interface circuit, and storage devices such as a ROM (Read Only Memory) device and a RAM (Random Access Memory) device. The microcomputer of the controller 70 is programmed to control the tensioning mechanism 48 and deployment of the airbags 1 to N. The memory circuit stores processing results and control programs such as ones for tensioning mechanism and airbag operation that are run by the processor circuit. The controller 70 is operatively coupled to the sensors 72, 74, the tensioning mechanisms 48 and the airbags 1 to N, in a conventional manner. The controller 70 is capable of selectively controlling any of the components of the tensioning mechanism 48 and the airbags 1 to N, in accordance with the control program. It will be apparent to those skilled in the art from this disclosure that the precise structure and algorithms for the controller 70 can be any combination of hardware and software that will carry out the functions of the present invention.

The various vehicle features, structures and elements are conventional components that are well known in the art. Since vehicle features, structures and elements are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the seatbelt assembly. Accordingly, these terms, as utilized to describe the present invention should be interpreted relative to a vehicle equipped with the seatbelt.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle seatbelt assembly, comprising:
a seat assembly having a seat cushion portion and a seatback portion, the seat cushion portion being configured to attach to a floor structure within a passenger compartment of a vehicle, the seatback portion being supported to the seat cushion portion and having a tether passageway defined therein extending from proximate an upper section downward toward a lower section of the seatback portion; and
a seatbelt tether having a tensioning mechanism that is non-movable relative to the seat assembly, a tether ring and an elongated connecting portion, the elongated connecting portion having a first end connected to the tensioning mechanism and a second end attached to the tether ring, the elongated connecting portion extending through the tether passageway of the seatback portion from the tensioning mechanism and out of the tether passageway to the tether ring, with the tether ring being located outside the tether passageway at the upper section of the seatback portion, the tether ring being shaped and dimension to receive a seatbelt such that the seatbelt can slidably move therethrough,
the tensioning mechanism being configured to selectively apply tension to the elongated connecting portion and the tether ring and move the elongated connecting portion and the tether ring a predetermined distance in response to detection of a tensioning event, such that in a non-tensioned state the tether ring is moveable to an upper outboard side of the seatback portion and in a tensioned state the tether ring is pulled in an inboard direction away from the upper outboard side of the seatback portion.

2. The vehicle seatbelt assembly according to claim 1, wherein
the elongated connecting portion consists of one of the following: a cable, a metallic rod and a nylon strap.

3. The vehicle seatbelt assembly according to claim 1, wherein
the tensioning mechanism is fixedly attached to one of the floor structure and the seat cushion portion.

4. The vehicle seatbelt assembly according to claim 1, wherein
the tensioning mechanism is coupled to a motion sensor that detects the tensioning event, the tensioning event being any of the following: a rapid deceleration of the vehicle body structure, a hard-braking event and an impact event.

5. The vehicle seatbelt assembly according to claim 1, wherein
the tensioning mechanism is configured to apply a predetermined level of tension to the elongated connecting portion and the tether ring in response to detection of the tensioning event.

6. The vehicle seatbelt assembly according to claim 1, wherein
the tensioning mechanism is configured to operate in response to detection of the tensioning event and apply tension to the elongated connecting portion and the tether ring via a one-time usage of a pyrotechnic device.

7. The vehicle seatbelt assembly according to claim 1, wherein
the tensioning mechanism includes an electric motor that is operated to apply tension to the elongated connecting portion and the tether ring in response to detection of the tensioning event and thereafter release the tension after a predetermined period of time.

8. The vehicle seatbelt assembly according to claim 1, wherein
the tensioning mechanism includes spring loaded device that applies tension to the elongated connecting portion and the tether ring in response to detection of the tensioning event and release the tension in response to lack of subsequent acceleration.

9. The vehicle seatbelt assembly according to claim 1, wherein
the seatback section includes a metallic frame covered by upholstery material, with an upper portion of the metallic frame includes a guide ring fixedly attached thereto with the elongated connecting portion of the seatbelt tether extending therethrough and through the upholstery material.

10. A vehicle seatbelt assembly, comprising:
a vehicle body structure having a floor structure and a pillar structure that at least partially define a passenger compartment;
a seat assembly having a seat cushion portion and a seatback portion, the seat cushion portion being attached to the floor structure, the seatback portion being supported to the seat cushion portion and having a tether passageway defined therein from proximate an upper section to proximate a lower section thereof;
a D-ring attached to the pillar structure within the passenger compartment above the seat cushion portion;
a seatbelt buckle assembly fixedly attached to one of the floor structure and the seat cushion portion;
a seatbelt tether having a tensioning mechanism, a tether ring and an elongated connecting portion having a first end coupled to the tensioning mechanism, the tensioning mechanism being fixed to one of the floor structure and the seat cushion portion, the elongated connecting portion extending through the tether passageway of the seatback portion with the tether ring located outside the tether passageway at the upper section of the seatback portion; and
a seatbelt coupled to the vehicle body structure such that the seatbelt extends through the D-ring, through the tether ring, and to a latch tongue that is configured to releasably attached to the seatbelt buckle assembly, with the tensioning mechanism being configured to selectively apply tension to the tether ring in response to a tensioning event, such that in an non-tensioned state the elongated connecting portion is extendable with the tether ring moveable to an upper outboard side of the seatback portion, and in a tensioned state the tether ring is pulled toward a headrest supporting section of the seatback portion inboard and away from the upper outboard side of the seatback portion.

11. The vehicle seatbelt assembly according to claim 10, wherein
the tensioning mechanism is coupled to a motion sensor that detects tensioning events, the tensioning event being any of the following: a rapid deceleration of the vehicle body structure, a hard-braking event and an impact event.

12. The vehicle seatbelt assembly according to claim 10, wherein
the tensioning mechanism is configured to apply a predetermined level of tension to the elongated connecting portion and the tether ring in response to detection of the tensioning event.

13. The vehicle seatbelt assembly according to claim 10, wherein
the tensioning mechanism is configured to move the elongated connecting portion and the tether ring a predetermined distance in response to detection of the tensioning event.

14. The vehicle seatbelt assembly according to claim 10, wherein
the tensioning mechanism is configured to operate in response to detection of the tensioning event and apply tension to the elongated connecting portion and the tether ring via a one-time usage of a pyrotechnic device.

15. The vehicle seatbelt assembly according to claim 10, wherein
the tensioning mechanism includes an electric motor that is operated to apply tension to the elongated connecting portion and the tether ring in response to detection of the tensioning event and thereafter release the tension after a predetermined period of time.

16. The vehicle seatbelt assembly according to claim 10, wherein
the tensioning mechanism includes spring loaded device that applies tension to the elongated connecting portion and the tether ring in response to detection of the tensioning event and release the tension in response to lack of subsequent acceleration.

17. The vehicle seatbelt assembly according to claim 10, wherein
the elongated connecting portion consists of one of the following: a cable, a metallic rod and a nylon strap.

18. The vehicle seatbelt assembly according to claim 10, wherein
the seatback portion includes a metallic frame covered by upholstery material, with an upper portion of the metallic frame includes a guide ring fixedly attached thereto with the elongated connecting portion of the seatbelt tether extending therethrough and through the upholstery material.

19. A vehicle seatbelt assembly, comprising:
a vehicle body structure having at least the floor structure and a pillar structure that partially define the passenger compartment;
a seat assembly having a seat cushion portion and a seatback portion, the seat cushion portion being configured to attach to a floor structure within a passenger compartment of a vehicle, the seatback portion being supported to the seat cushion portion and having a tether passageway defined therein extending from proximate an upper section downward toward a lower section of the seatback portion, with the seat cushion portion being attached to the floor structure;
a seatbelt tether having a tensioning mechanism that is non-movable relative to the seat assembly, a tether ring and an elongated connecting portion, the elongated connecting portion having a first end connected to the tensioning mechanism and a second end attached to the tether ring, the elongated connecting portion extending through the tether passageway of the seatback portion from the tensioning mechanism and out of the tether passageway to the tether ring, with the tether ring being located outside the tether passageway at the upper section of the seatback portion, the tether ring being shaped and dimension to receive a seatbelt such that the seatbelt can slidably move therethrough;
a D-ring attached to the pillar structure within the passenger compartment above the seat cushion portion;
a seatbelt buckle assembly fixedly attached to one of the floor structure and the seat cushion portion; and
a seatbelt having a first end coupled to the pillar structure of the vehicle body structure such that the seatbelt extends through the D-ring, through the tether ring, and to a latch tongue that is configured to releasably attached to the seatbelt buckle assembly,
the tensioning mechanism being configured to selectively apply tension to the elongated connecting portion and the tether ring in response to detection of a tensioning event, such that in a non-tensioned state the tether ring is moveable to an upper outboard side of the seatback portion and in a tensioned state the tether ring is pulled in an inboard direction away from the upper outboard side of the seatback portion.

* * * * *